United States Patent [19]

Yamamoto

[11] Patent Number: 5,539,589

[45] Date of Patent: Jul. 23, 1996

[54] MAGNETIC REPRODUCTION DEVICE AND METHOD FOR ENSURING REPRODUCTION OF RECORDED INFORMATION BY A MAGNETIC HEAD OF A SAME AZIMUTH ANGLE AS USED TO RECORD INFORMATION

[75] Inventor: Junichi Yamamoto, Nagaokakyo, Japan

[73] Assignee: Mitsubishi Denki Kabushiki Kaisha, Tokyo, Japan

[21] Appl. No.: 240,451

[22] Filed: May 10, 1994

[30] Foreign Application Priority Data

May 26, 1993 [JP] Japan .................................. 5-124100

[51] Int. Cl.$^6$ .......................... G11B 15/14; H04N 5/78
[52] U.S. Cl. .................................. 360/64; 360/33.1
[58] Field of Search ........................ 360/61, 64, 33.1; 358/335

[56] References Cited

U.S. PATENT DOCUMENTS

| 4,388,657 | 6/1983 | Hedlund et al. ................ 360/72.1 |
| 5,121,265 | 6/1992 | Hirose et al. ....................... 360/64 |

FOREIGN PATENT DOCUMENTS

| 0136816 | 4/1985 | European Pat. Off. . |
| 58-40987 | 3/1983 | Japan . |
| 59-135985 | 8/1984 | Japan . |
| 63-55201 | 4/1988 | Japan . |
| 2-16409 | 2/1990 | Japan . |
| 2226686 | 7/1990 | United Kingdom . |

OTHER PUBLICATIONS

"A Study on the Noise-less Continuous Slow Payback Method of Time Lapse VCR" by Messrs. Watanabe, Okada, Tanaka and Sakae; Image & Media System laboratory; Consumer Electronics Division, Hitachi Ltd.; 1993 ITE Annual Convention; pp. 361–362. (Month Not Available).

*Primary Examiner*—W. Chris Kim

[57] ABSTRACT

A magnetic reproduction device includes a comparator for comparing the level of reproduced signals obtained by tracing the same track with magnetic heads having different azimuths, and switches for selecting and supplying any of the reproduced signals in accordance with the result of the comparison. The magnetic heads thus used for reproduction are therefore determined simultaneously with the start of reproduction. This allows for the automatic supply of correct reproduced signals, even if an azimuth of the magnetic heads which recorded the signals is unknown.

9 Claims, 11 Drawing Sheets

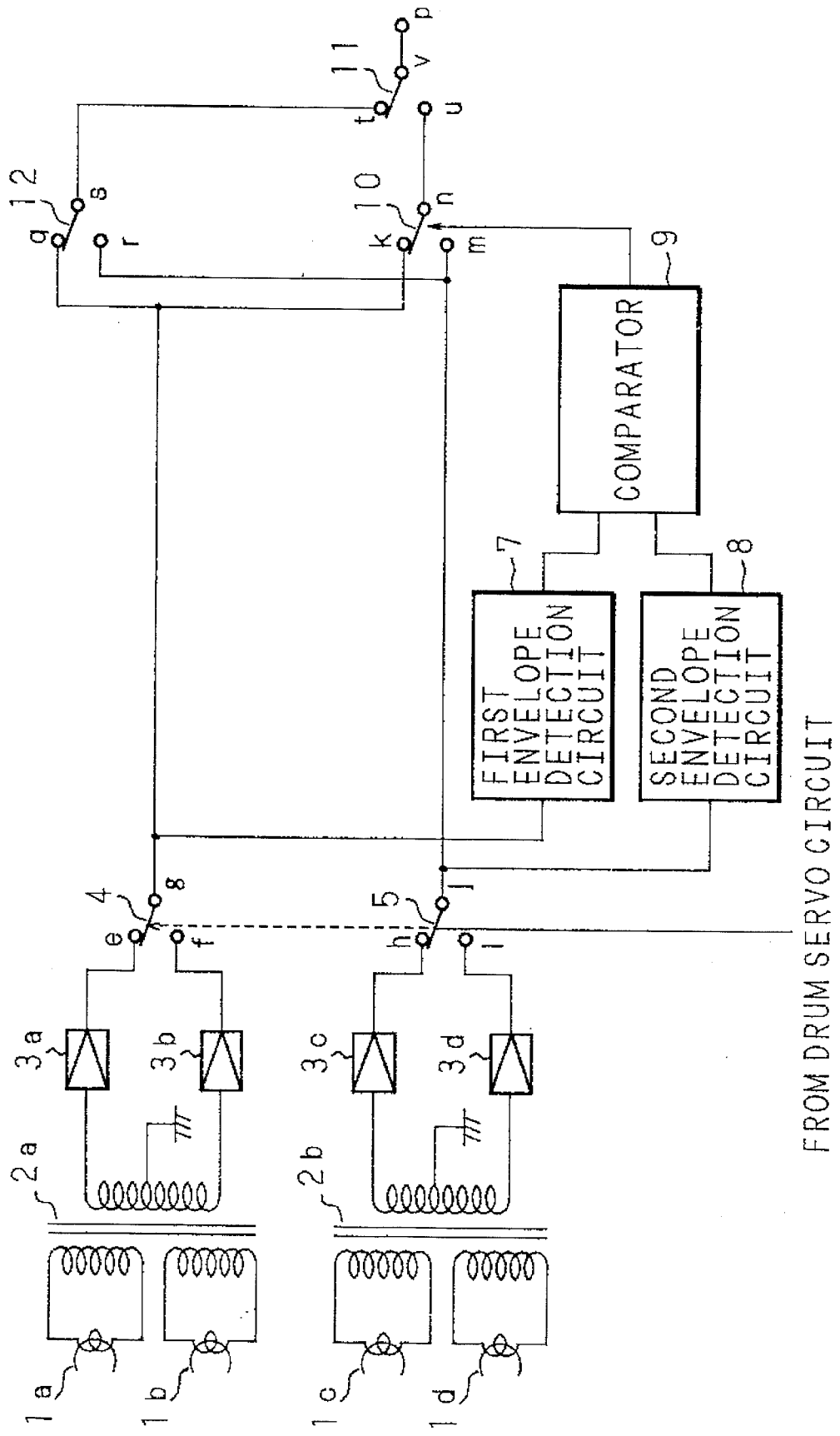

MAGNETIC REPRODUCTION DEVICE AND METHOD FOR ENSURING REPRODUCTION OF RECORDED INFORMATION BY A MAGNETIC HEAD OF A SAME AZIMUTH ANGLE AS USED TO RECORD INFORMATION

BACKGROUND OF THE INVENTION

1. Field of the Invention

The present invention relates to a magnetic reproduction device provided with a plurality of magnetic heads having different azimuths, and more particuarly, to a magnetic reproducing device which automatically selects, in a reproducing operation, magnetic heads having an azimuth suitable to a type of recording.

2. Description of Related Art

Time lapse VTRs have been used for monitor and guard purposes, The time-lapse VTR, which is also called as a long-time VTR, can perform lone-time recording on one magnetic tape by frame-recording of image signals in contrast to VTRs for home use which make continuous recording of image signals on a magnetic tape, A majority of time-lapse VTRs are based on VTRs for home use (e,g,, of VHS type, Beta type and 8 mm type) because necessary magnetic tapes are easily available and the VTRs can be manufactured with ease. The Lime-lapse VTRs of a 2-head helical scan type are classified into following types:

(1) Both of two magnetic heads have a (+) azimuth;

(2) Both of two magnetic heads use a (−) azimuth; or (3) A magnetic head of a (+) azimuth and a head of a (−azimuth) are used.

The magnetic head of a (+) azimuth and the magnetic head of a (−) azimuth record signals onto magnetic tapes with different azimuths.

FIG. 1 schematically shows a head drum of a time-lapse VTR of a 2-head helical scan type in the prior art, and particularly, of the above type (1). In the figure, at 21 is indicated a rotary drum, to which two opposed magnetic brads A1 and B1 are attached with an angular space of 180 degrees between each other. These magnetic heads A1 and B1 carry out recording with the same (+) azimuth, and alternately record input signals onto a magnetic tape. Switching between the heads A1 and B1 is conducted in accordance with a head switching pulse provided from a drum servo circuit (not shown).

FIG. 2 conceptually shows tracks on a magnetic tape having signals recorded by the foregoing VTR. In the figure, at 31 is indicated a magnetic tape, including tracks A1 recorded by the magnetic head A1, and tracks B1 recorded by the magnetic head B1.

FIG. 3 schematically shows a head drum of a time-lapse VTR of the 2-head helical scan type, and particularly, of the above type (2). FIG. 4 conceptually shows tracks on the magnetic tape onto which signals are recorded by the VTR in FIG. 3. Magnetic heads A0 and B0 are attached to a rotary drum 22. These magnetic heads A0 and B0 record with the same (−) azimuth, and alternately record supplied signals onto a magnetic tape 22. Other points of the structure are the same as those of the VTR of the above type (1), and thus will not be described in detail.

FIG. 5 schematically shows a head drum of a time-lapse VTR of the 2-head helical scan type, and particularly, of the above type (3). FIG. 6 conceptually shows tracks of a magnetic tape where signals are recorded by the VTR of FIG. 5. Magnetic heads A0 and B1 are attached to a rotary drum 23. The magnetic heads A0 and B1, which are of the (−) and (+) types, respectively, carry out recording with different azimuths, and record t,he supplied signals alternately onto a magnetic tape 33. Other points of the structure are the same as those of the VTR the above type (1), and thus will not be depicted in detail.

Signals recorded onto the tracks by the magnetic heads of a (+) azimuth of the time-lapse VTR cannot be reproduced with the magnetic heads of a (−) azimuth. Meanwhile, signals recorded onto the tracks with the magnetic heads of a (−) azimuth cannot be reproduced with the magnetic heads of a (+) azimuth. That is, tapes recorded with the time-lapse VTR of one type cannot be reproduced with the time-lapse VTR of another type. For example, tapes recorded with the VTR of the above type (1) cannot be reproduced with the VTR of the type (2). Conversely, tapes recorded with the VTR of the type (2) cannot be reproduced with the VTR of the type (1). Further, the VTR of the type (3) can reproduce tapes recorded by the VTRs of the types (1) and (2), with only one of the magnetic heads.

Since both recording and reproducing have been usually achieved in one time-lapse VTR, low compatibility of magnetic tapes causes no inconvenience. In recent years, however, time-lapse VTRs for monitor or guard purposes have come into wide use, and hence compatibility of tapes has become more important.

In order to comply with the above demand, a time-lapse VTR of a double azimuth 4-head type has been developed. FIG. 7 schematically shows a head drum and four heads of the double azimuth type. 20 represents a rotary drum, to which two opposed magnetic heads 1a and 1b are attached with an angular space of 180 degrees between each other. The magnetic head 1a is a (+) azimuth magnetic head, and the magnetic head 1b is a (−) azimuth magnetic head. There is also provided a (−) azimuth magnetic head 1c which is angurarly spaced by a predetermined angle θ, e.g., 1.4 degrees from the magnetic head 1a with respect to the center of rotation of the drum 20. There is further provided a (+) azimuth magnetic head which is opposed to the magnetic head 1c in the diametrical direction of the drum 20.

For recording signals by the time-lapse VTR thus constructed, the (+) azimuth magnetic head 1a and azimuth magnetic head 1b are usually used, and the magnetic tape recorded in this manner will be reproduced with the magnetic heads 1a and 1b .

In the case where the magnetic tape onto which signals were recorded by the VTR of the above type (2), the tape is reproduced with the (+) azimuth magnetic head 1a and (+) azimuth magnetic head 1d. On the other hand, in the case where the magnetic tape with signals recorded by the VTR of the above type (2), reproduction therefrom is allowed with The (−) azimuth magnetic head 1b and (−) azimuth magnetic head 1c.

As described above, the time-lapse VTR provided with four heads of a double azimuth type can provide compatibility among magnetic tapes recorded by the VTRs of the above three types. However, if the type of time-lapse VTR recording the subject magnetic tape to be reproduced unknown, the tape is first reproduced with the ordinary (+) azimuth magnetic head 1a and the (−) azimuth magnetic head 1b , and then it is determined whether the reproduction correct or not from the reproduced pictures. If the reproduction is not correct, another combination of magnetic heads is manually selected by means of a switch, and this selecting operation should be repeated until correct pictures are obtained.

SUMMARY OF THE INVENTION

The present invention has been developed in order to overcome the above disadvantages, and it is an object of the invention to provide a magnetic reproduction device, in which magnetic heads to be used for reproduction are determined simultaneously with the start of reproduction, and signals reproduced with the appropriately selected magnetic heads are automatically supplied even when an azimuth of magnetic heads used to record the signals is unknown.

The present invention provides a magnetic reproduction device of a double azimuth 4-head type having four magnetic heads, which includes first and second signal switching means for switching reproduced signals obtained from the magnetic heads, third signal switching means for receiving the reproduced signals supplied from the first and second signal switching means and switching and applying either of the reproduced signals supplied from the first and second signal switching means, and comparing means for receiving the reproduced signals from the first and second signal switching means and comparing the level of the signals thereby to supply a control signal for controlling the switching in accordance with the comparing result to the third signal switching means.

Therefore, in accordance with the result of the comparison by the comparing means, the third signal switching means is switched to select the reproduced signals, for example, of the larger level among those supplied from the first and second signal switching means, whereby correct reproduced signals are obtained.

Another object of the invention is to provide a magnetic reproduction device which can obtain reproduced signals containing less noises from a magnetic tape recorded by magnetic heads having different azimuths, even if the tracking adjustment is insufficient.

In view of the above object, the present invention provides a magnetic reproduction device which features, in addition to components of the Foregoing magnetic reproduction device, fourth signal switching means for receiving reproduced signals recorded onto a magnetic tape with magnetic heads having different azimuths and supplied from the first, second and third signal switching-means, and which is manually switched to output the reproduced signal from only one of the first and second signal switching means when a level difference resulting from the comparison by the comparing means is smaller than a predetermined value.

Therefore, even in the case where the comparing means accompanies hunting due to the insufficient tracking adjustment, the fourth signal switching means outputs the reproduced signals from either the first or the second signal switching means, so that the reproduced signals, without noises caused by hunting, can be obtained.

The above and further objects and features of the invention will more fully be apparent from the following detailed description with accompanying drawings.

BRIEF DESCRIPTION OF THE DRAWINGS

FIG. 11 is a block diagram showing a structure for automatically selecting magnetic heads in a time-lapse VTR of a second embodiment.

DESCRIPTION OF THE PREFERRED EMBODIMENTS

Embodiments of the invention will be described below with reference to the drawings.

Figure 8:
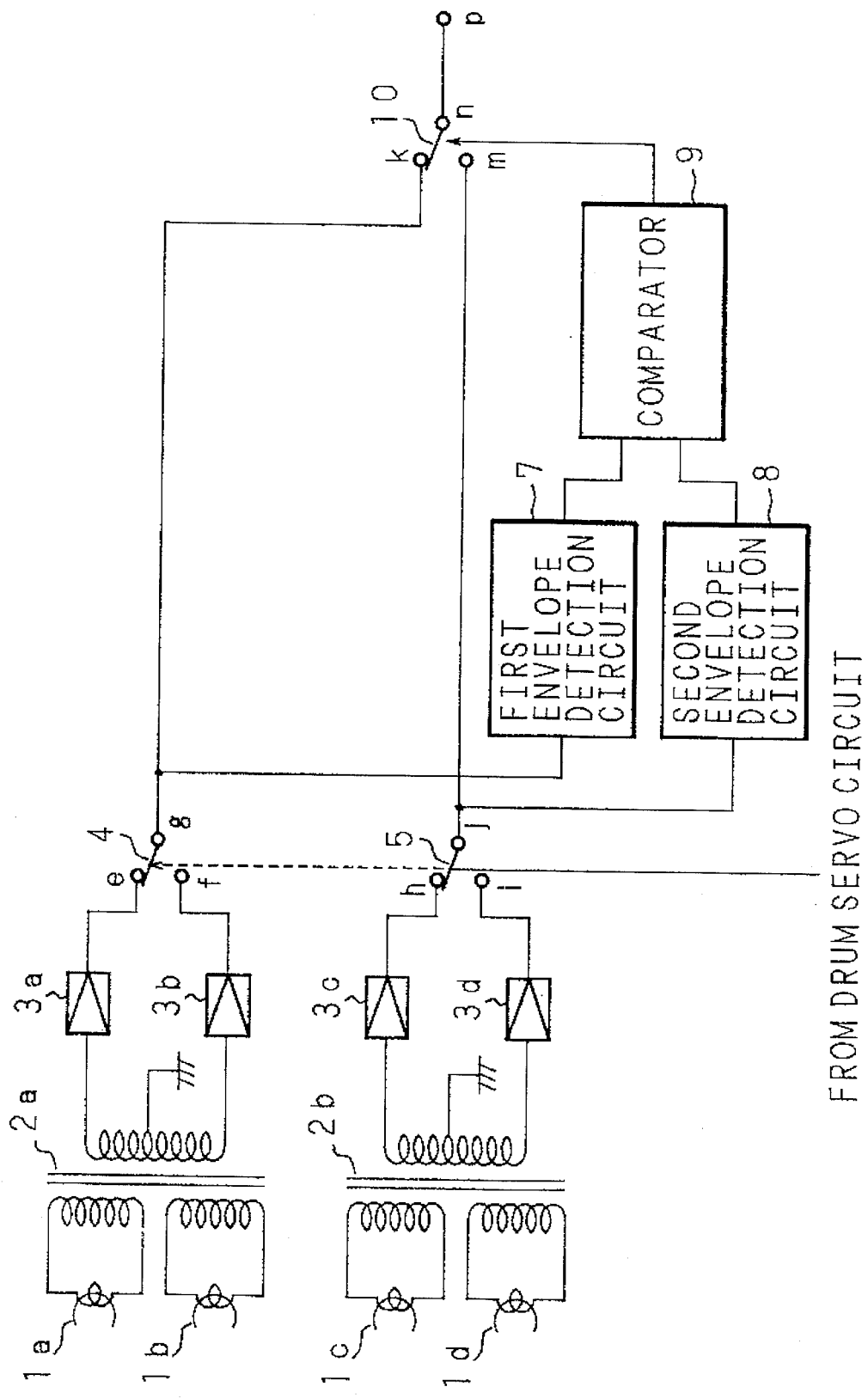
FIG. 8 is a block diagram showing a structure for automatically selecting magnetic heads in a time-lapse VTR of a first embodiment of the invention.
Figure 9:
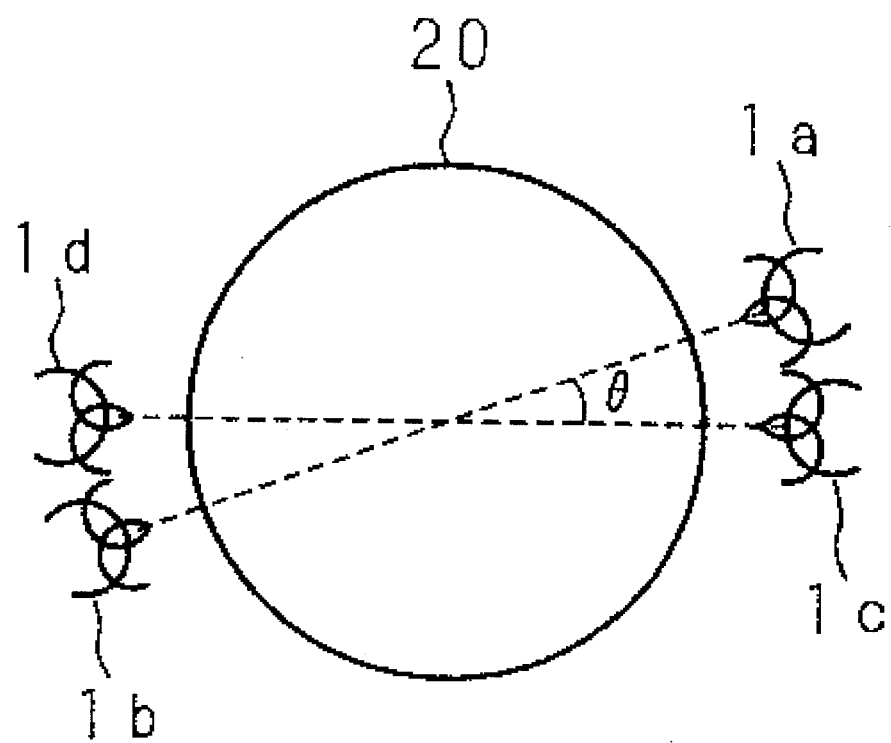
FIG. 9 schematically shows an arrangement of magnetic heads of a magnetic drum included in the time-lapse VTR shown in FIG. 8.

FIG. 8 is a block diagram showing a structure for automatically selecting magnetic heads in a time-lapse VTR of a first embodiment of the invention, and FIG. 9 schematically shows an arrangement of magnetic heads of a magnetic drum in the time-lapse VTR shown in FIG. 8. In FIG. 9, 20 indicates a rotary drum, to which two opposed magnetic heads 1a and 1b are attached with an angular space of 180 degrees between each other. The magnetic head 1a is a (+) azimuth magnetic lead, and the magnetic head 1b is a (−) azimuth magnetic head. There is also provided a (−) azimuth magnetic head 1c which is angularly spaced by a predetermined angle θ, e.g., 1.4 degrees from the magnetic head 1a with respect to the center of rotation of the drum 20. There is further provided a (+) azimuth magnetic head 1d which is angularly spaced by 180 degrees from the magnetic head 1c with respect to the center of rotation of the drum 20.

As shown in FIG. 8, signals from the magnetic heads 1a and 1b are inputted via a rotary transformer 2a to head amplifiers 3a and 3b and are amplified thereby, respectively. The amplified signals are respectively supplied to switch terminals e and f, i.e., terminals at a switchable side of a first switch unit 4. Signals provided from the magnetic heads 1c and 1d are supplied via a rotary transformer 2b to head amplifiers 3c and 3d and are amplified respectively thereby. The signals are then fed to switch terminals h and i of a second switch unit 5.

The first switch unit 4 includes the switch terminals e and f as well as a common terminal g. The second switch unit 5 includes the switch terminals h and i as well as a common terminal j. A drum servo circuit (not shown) produces a head switching pulse so as to switch the diametrically opposed heads in accordance with a signal sent from a phase detector means for detecting an angular position of the drum. The head switching pulse is applied to the switch units 4 and 5. The switch units 4 and 5 interlock and operate in accordance with the head switching pulse in such a manner that the second switch unit 5 selects the switch terminal h when the first switch unit 4 selects the switch terminal e. When the first switch unit 4 selects the switch terminal f, the second switch unit 5 selects the switch terminal i. Accordingly, the outputs of head amplifiers 3a and 3b and the outputs of head amplifiers 3c and 3d are alternately selected every half rotation of the rotary drum 20 and applied to the corresponding common terminals g and j. The signals applied to the common terminals g and j are sent to switch terminals k and m provided in a third switch unit 10, respectively. The third switch unit 10 includes the switch terminals k and m besides a common terminal n.

Meanwhile, the signals outputted from the common terminals g and j are also supplied to first and second envelope detection circuits 7 and 8, respectively, which detect envelope waves of the signals and provide output signals to a comparator 9. The comparator 9 compares the level of these output signals, and generates a control signal corresponding to the result of the comparison to the third switch unit 10. This control signal serves to connect the common terminal n to the switch terminal k in the switch unit 10 if the signal sent from the first envelope detection circuit 7 is larger than the signal from the second envelope detection circuit 8, and also serves to connect the common terminal n to the switch terminal m in the switch unit 10 if the signal from the first envelope detection circuit 7 is smaller than the signal from the second envelope detection circuit 8.

As described above, the switch unit 10 receives at the switch terminal k the signal from the magnetic head 1a or 1b, and also receives at the switch terminal m the signal from the magnetic head 1c or 1d. These signals are selected by controlling of switching of the switch unit 10 and supplied to an output terminal p.

The time-lapse VTR thus constructed reproduces a magnetic tape recorded with magnetic heads the azimuth of which is unknown, as described below.

The magnetic heads 1a, 1b, 1c and 1d trace the tracks on the magnetic tape thereby to reproduce and provide signals recorded onto the tracks. First, in response to the head switching pulse, the First switch unit 4 selects the switch terminal e, and the second switch unit 5 selects the switch terminal h. The magnetic head 1a of a (+) azimuth and the magnetic head 1c of a (−) azimuth which are tracing the same track supply the signals to the comparator 9 via the head amplifiers 3a,3c and envelope detection circuits 7 and 8. The comparator 9 compares the level of these signals. If it is found from the result of the comparison that the signals sent, for example, from the (+) azimuth magnetic head 1a are larger than the other signals, the comparator 9 supplies the control signal for selecting the switch terminal k to the third switch unit 10.

After half rotation of the rotary drum 20, the head switching pulse causes the First switch unit 4 to select the switch terminal f, and similarly the second switch unit 5 to select the switch terminal i. As a result, the magnetic head 1b of a (−) azimuth and the magnetic head 1d of a (+) azimuth which are tracing the same track supply the signals to the comparator 9 via the head amplifiers 3b, 3d and envelope detection circuits 7 and 8. The comparator 9 compares the level of these inputted signals. If the result of the comparison shows that the signals sent, for instance, from the (+) azimuth magnetic head 1d are larger than the other signals, the comparator 9 supplies the control signal for selecting the switch terminal m to the third switch unit 10.

Figure 1:
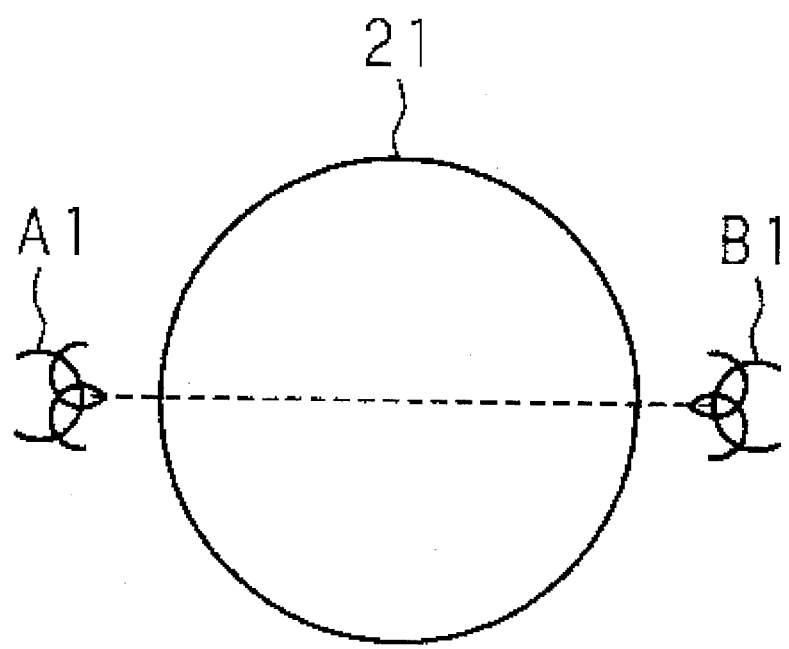
FIG. 1 schematically shows a head drum of a time-lapse VTR of a 2-head helical scan type in the prior art.
Figure 2:
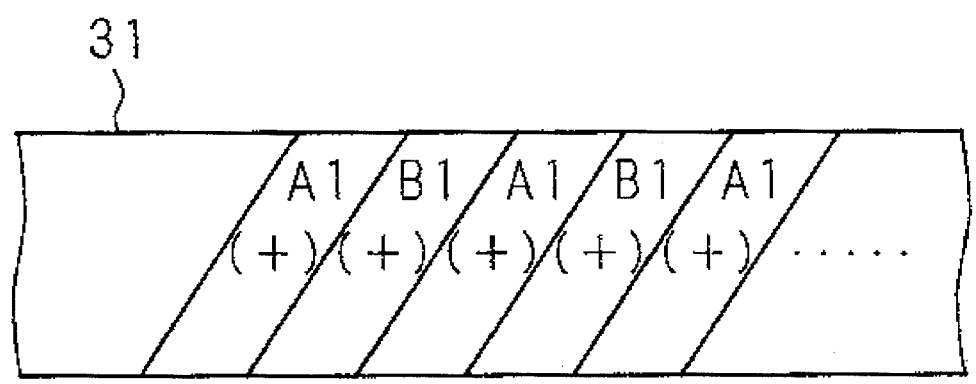
FIG. 2 conceptually shows tracks on a magnetic tape recorded with the VTR in FIG. 1.
Figure 3:
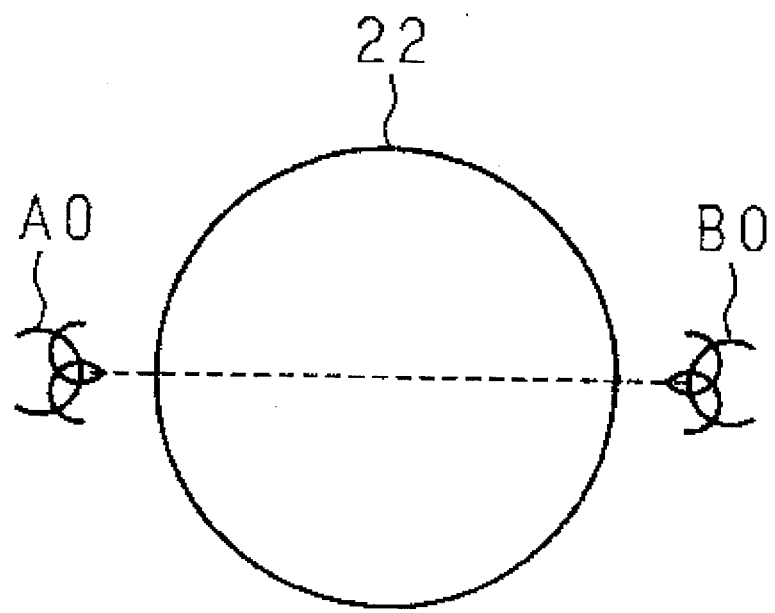
FIG. 3 schematically shows a head drum of a time-lapse VTR of a 2-head helical scan type in the prior art.

In the foregoing case, the (+) azimuth magnetic head 1a and the (+) azimuth magnetic head 1d reproduce correct signals, and the time-lapse VTR of the type (1), described earlier with reference to FIG. 2, is used for recording the signals onto the magnetic tape. As described above, the third switch unit 10 is switched between the switch terminals k and m, whereby the magnetic heads of the same type as those of the time-lapse VTR of the type (1) can be automatically selected to reproduce the signals recorded on the magnetic tape.

In the case where the first switch unit 4 selects the switch terminal e and the second switch unit 5 selects the switch terminal h, if it is found as a result of the comparison that the signals sent from the (−) azimuth magnetic head 1c are larger than the other signals, the comparator 9 provides to the third switch unit 10 the control signal for selecting the switch terminal m. When the first and second switch units 4 and 5 select the switch terminals f and i, respectively, after half rotation of the rotary drum 20, the comparator 9 sends the control signal For the third switch unit 10 to select the switch terminal k if the signals sent from the (−) azimuth magnetic head 1b are larger than the other signals.

Figure 4:
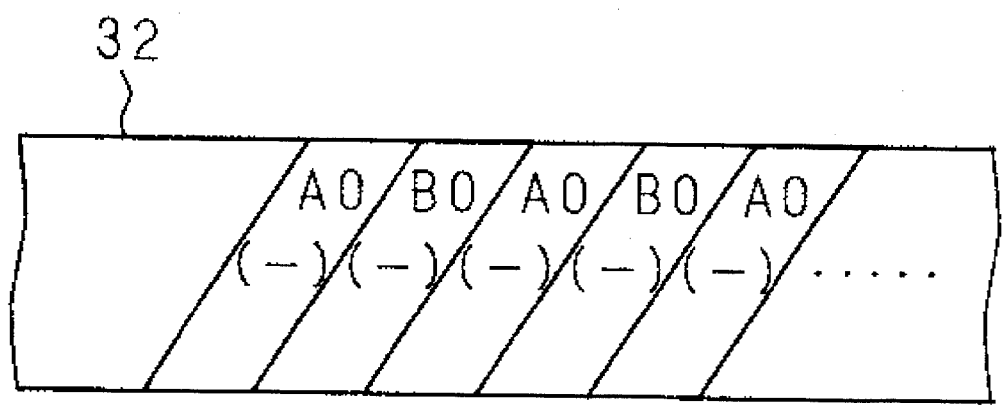
FIG. 4 conceptually shows tracks on a magnetic tape recorded with the VTR in FIG. 3.
Figure 5:
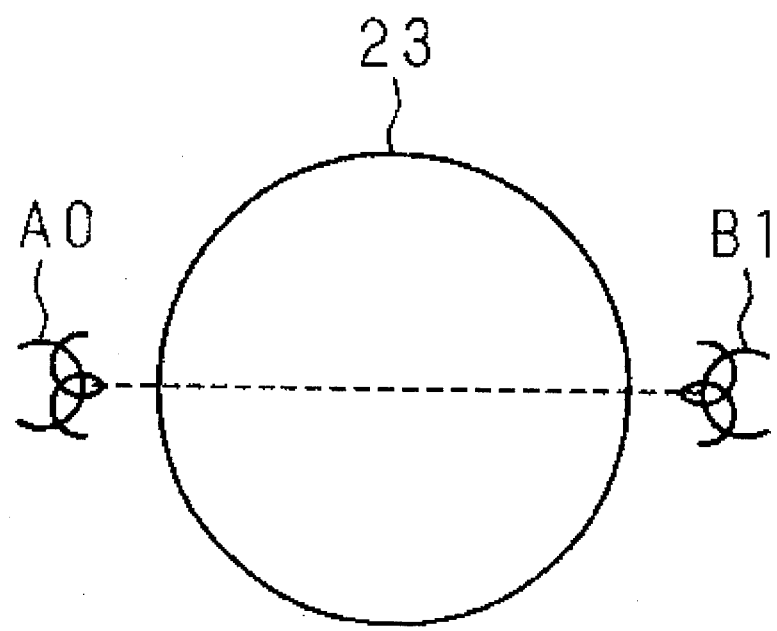
FIG. 5 schematically shows a head drum of a time-lapse VTR of a 2-head helical scan type in the prior art.

In the foregoing latter case, the (−) azimuth magnetic head 1b and the (−) azimuth magnetic head 1c reproduce correct signals, and the time-lapse VTR of the type (2) which has been described with reference to FIG. 4 is used for recording the signals onto the magnetic tape. As is clear from the above, the third switch unit 10 is switched between the switch terminals m and k, whereby the magnetic heads of the same type as those of the time-lapse VTR of the type (2) can be automatically selected to reproduce the signals recorded on the magnetic tape.

Similarly, if the signals sent from the switch terminal e are larger than those from the switch terminal h, and the signals from the switch terminal f are detected to be larger than the signals from the switch terminal i subsequent to the half rotation of the rotary drum 20, the comparator 9 supplies the control signal for the third switch unit 10 to fix the connection to the switch terminal k. To the contrary, if the signals from the switch terminal h are larger than those sent from the switch terminal e, and the signals from the switch terminal i become larger than those From the switch terminal f after half rotation of the rotary drum 20, the comparator 9 provides to the third switch unit 10 the control signal to fix the connection to the switch terminal m.

Figure 6:
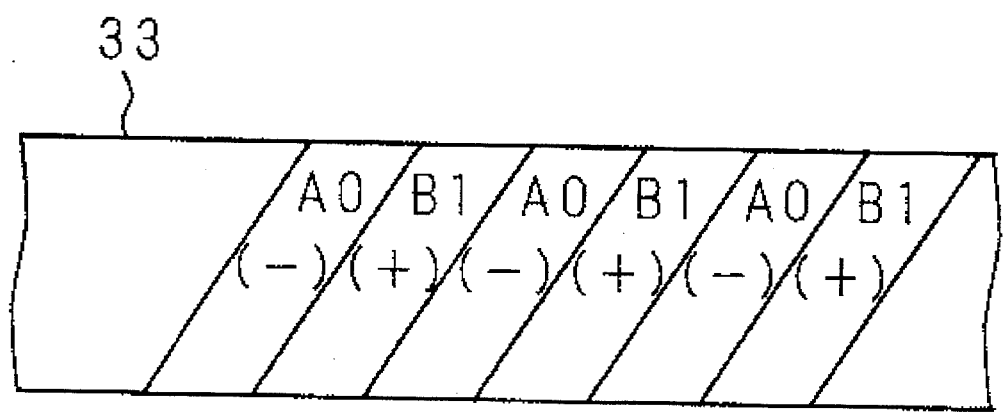
FIG. 6 conceptually shows tracks on a magnetic tape recorded with the VTR in FIG. 5.
Figure 7:
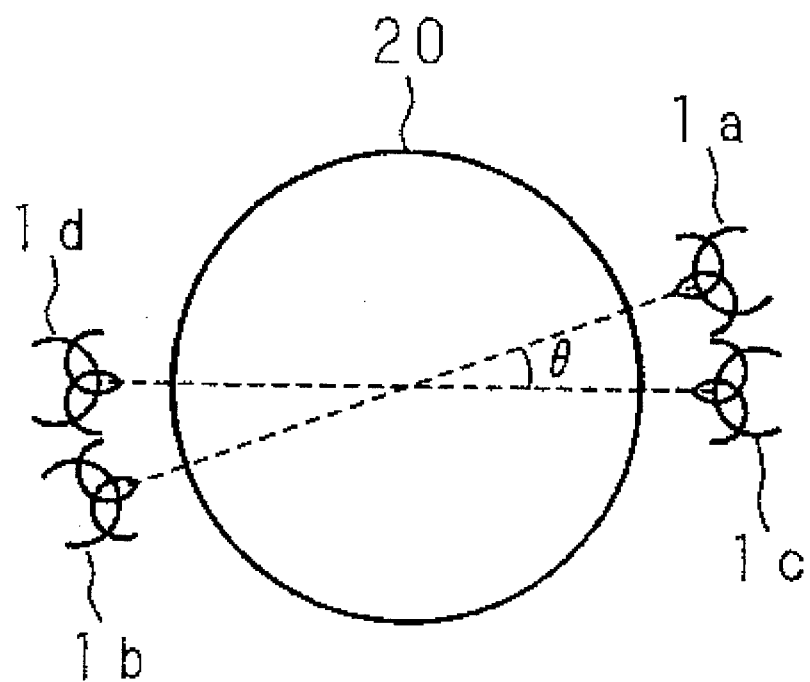
FIG. 7 schematically shows an arrangement of a head drum of a time-lapse VTR of a double azimuth 4-head type in the prior art.

In the foregoing case, the time-lapse VTR of the type (3) which has been described before with reference to FIG. 6 is used for recording the signals onto the magnetic tape. As described hereinabove, the third switch unit 10 is fixed to select the switch terminal m or k, whereby the magnetic heads of the same type as those of the time-lapse VTR of the type (3) can be automatically selected to reproduce the signals recorded on the magnetic tape.

According to the time-lapse VTR of the invention, the magnetic heads to be used are automatically selected simultaneously with the start of reproduction, and the magnetic tape can be readily reproduced even if the azimuth of the magnetic heads used to record the signals onto the magnetic tape is unknown.

Now, a second embodiment of the invention will be discussed below with reference to the drawings.

Figure 10:
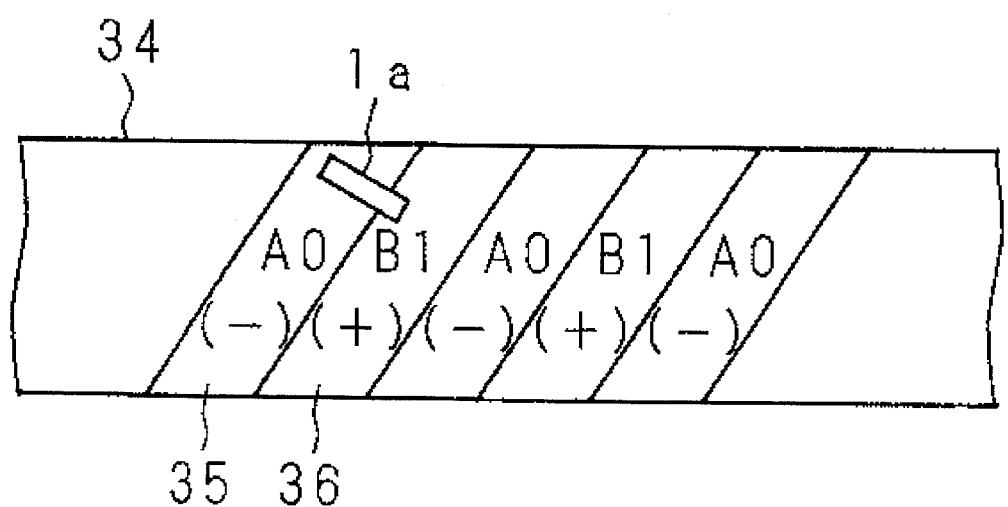
FIG. 10 shows a state of tracing by magnetic heads in the case of the insufficient tracking adjustment.

In reproducing a magnetic tape recorded by the time-lapse VTR of the type (3) having the (+) and (−) azimuth magnetic heads with the use of the time-lapse VTR of the first embodiment, it may sometimes be impossible to correctly trace the tracks of the magnetic tape due to a failure in the tracking adjustment, which may lead to hunting in the comparator 9. For example, as shown in FIG. 10 representing a state of tracing with the magnetic heads, if the (+) azimuth magnetic head 1a and the unillustrated (−) azimuth magnetic head 1b trace the magnetic tape astride a track 35 recorded with the (−) azimuth magnetic head and a track 36 recorded with the (+) azimuth magnetic head, the level difference between the output signals from the two magnetic heads 1a and 1b is small. Therefore, the comparator 9 may provide an unstable control signal, resulting in noises in reproduced pictures. This disadvantage will be overcome by a time-lapse VTR of the second embodiment of the invention, which will be described below.

FIG. 11 is a block diagram showing a structure for automatically selecting the magnetic heads in the time-lapse VTR of the second embodiment. Signals are respectively provided from the magnetic heads 1a, 1b, 1c and 1d to the switch terminals e, f, h and i of the first and second switch units 4 and S. By switching the switch units 4 and 5, the signals supplied from the magnetic heads 1a and 1c are inputted to the switch terminal k of the third switch unit 10, and the signals of the magnetic heads 1b and 1d are supplied to the switch terminal m of the third switch unit 10. The signal outputted from the common terminal n in the third switch unit 10 is sent to a switch terminal u of a fourth switch unit 11.

Meanwhile, signals from the switch units 4 and 8 are also supplied to switch terminals q and r of a fifth switch unit 12. The Fifth switch unit 12 includes the switch terminals q and r in addition to a common terminal s which outputs signals to a switch terminal t of the fourth switch unit 11. The fourth switch unit 11 includes the switch terminals t and u as well as a common terminal v, signals from the common terminal v are sent to the output terminal p.

Other points of the structure are the same as those of the VTR of the first embodiment shown in FIG. 8. Corresponding portions and parts bear the same reference numbers, and will not be described below.

The time-lapse VTR thus constructed reproduces the magnetic tape recorded with the time-lapse VTR of the type (3) in a manner similar to the first embodiment. However, if the reproduced pictures contain much noise, it is determined that the tracking adjustment is insufficient, and the fourth switch unit 11 is manually switched to the switch terminal t. The signals reproduced after this switching are fed to the output terminal p via the fifth switch unit 12 without passing through the third switch unit 10. In this state, the fifth switch unit 12 is switched and fixed to select the switch terminal q or r which attains good reproduced pictures, thereby preventing unstable switching of the switch units.

As described above, even if the tracking adjustment is insufficient for reproduction of the magnetic tape recorded by the time-lapse VTR of the type (3), reproduced pictures include less noise.

Although the embodiments have been described in connection with the time-lapse VTR, the invention is not restricted to these embodiments, and is applicable to various types of magnetic reproduction devices which are provided with a plurality of magnetic heads having different azimuths and at least a reproduction function.

As this invention may be embodied in several forms without departing from the spirit of essential characteristics thereof, the present embodiment is therefore illustrative and not restrictive, since the scope of the invention is defined by the appended claims rather than by the description preceding them; and all changed that fall within metes and bounds of the claims, or equivalence of such metes and bounds thereof are therefore intended to be embraced by the claims.

What is claimed is:

1. A magnetic reproduction device comprising:

a rotary drum having an outer periphery to be contacted to a magnetic tape;

first and second magnetic heads, attached to said rotary drum in a symmetrical relationship to each other with respect to the center of rotation of said rotary drum, each having different azimuths;

a third magnetic head, spaced a predetermined angle from said first magnetic head, for tracing the same track on said magnetic tape as traced by said first magnetic head;

a fourth magnetic head, arranged in a position symmetrical to said third magnetic head with respect to said center of rotation, having an azimuth different from that of said third magnetic head, for tracing the same track as traced by said second magnetic head;

first signal switching means for receiving signals reproduced from said tracks traced by said first and second magnetic heads during a reproduction operation, and selecting the reproduced signals of one of the first and second magnetic heads based on a head switching signal received every half rotation of said rotary drum;

second signal switching means for receiving signals reproduced from said tracks traced by said third and fourth magnetic heads, and selecting the reproduced signals of one of the third and fourth magnetic heads based on a head switching signal received every half rotation of said rotary drum;

third signal switching means for receiving the reproduced signals supplied from said first and second signal switching means and for selecting one of the reproduced signals supplied from said first and second signal switching means;

comparing means for receiving the reproduced signals supplied from said first and second signal switching means, comparing signal level of the received signals producing a control signal based upon said comparison, and controlling said third signal switching means to select one of the received reproduced signals supplied from the first and second signal switching means in accordance with the result of the comparison for each of the plurality of tracks traced to thereby ensure reproduction of signals from tracks of a magnetic tape by a magnetic head having a same azimuth as a magnetic head which recorded the tracks onto the magnetic tape; and fourth signal switching means for receiving reproduced signals, recorded onto said magnetic tape with magnetic heads having different azimuths, and supplied from said first, second and third signal switching means, for being switched to select the reproduced signal sent from only one of said first and said second signal switching means when distortion of an output signal is recognized, the distortion resulting from the comparing means detecting virtually no difference in reproduced signal level of the received signals.

2. A magnetic reproduction device according to claim 1, wherein said comparing means produces said control signal to control said third signal switching means to select the reproduced signal of the larger level, as determined as a result of the comparison.

3. The magnetic reproduction device of claim 1, wherein the fourth signal switching means is manually switched.

4. A magnetic reproduction method comprising the steps of:

(a) tracing a first and second track of a magnetic tape with a first and second magnetic head, respectively, each of the first and second magnetic heads having different azimuths and being attached to a rotary drum in a symmetrical relationship to each other with respect to the center of rotation of the rotary drum, the rotary drum being contacted to the magnetic tape;

(b) tracing the first track again, by a third magnetic head spaced a predetermined angle from said first magnetic head;

(c) tracing the second track again, by a fourth magnetic head arranged in a position symmetrical to said third magnetic head with respect to said center of rotation of the rotary drum, and having an azimuth different from that of said third magnetic head;

(d) receiving signals reproduced from the tracks traced by the first and second magnetic heads during a reproduction operation at a first switch;

(e) selecting the reproduced signals of one of the first and second magnetic heads based on a head switching signal received by the first switch every half rotation of the rotary drum;

(f) receiving signals reproduced from the tracks traced by the third and fourth magnetic heads at a second switch;

(g) selecting the reproduced signals of one of the third and fourth magnetic heads based on a head switching signal received by the second switch every half rotation of the rotary drum;

(h) receiving the reproduced signals at a third switch, supplied from the first and second switches;

(i) selecting, by the third switch, one of the reproduced signals supplied from the first and second switches;

(j) comparing signal level of the reproduced received signals received from the first and second switches;

(k) producing a control signal based upon said comparison;

(l) controlling the third switch to select one of the received reproduced signals supplied from the first and second switches in accordance with the result of the comparison for each of the plurality of tracks traced to thereby ensure reproduction of signals from tracks of a magnetic tape by a magnetic head having a same azimuth as a magnetic head which recorded the tracks onto the magnetic tape; and (m) receiving reproduced signals at a fourth switch, recorded onto the magnetic tape with magnetic heads having different azimuths and supplied from said first, second and third switches;

(n) selecting, by switching the fourth switch, the reproduced signal sent from only one of the first and the second switches when distortion of an output signal is recognized, the distortion resulting from detection of virtually no difference in reproduced signal level of the received signals in comparing step (j).

5. The magnetic reproduction method of claim 4, wherein said step (k) produces the control signal to control the third switch to select the reproduced signal of the larger level, as determined as a result of the comparison of step (j).

6. The magnetic reproduction method of claim 4, wherein the selecting step (n) includes manually switching the fourth switch.

7. A magnetic reproduction device comprising:

first signal switching means for receiving signals reproduced from a first track of a magnetic tape traced by a first magnetic head and a second track of the magnetic tape traced by a second magnetic head, each of the first and second magnetic heads having different azimuths, and for selecting the reproduced signals of one of the first and second magnetic heads based on a head switching signal received every half rotation of a rotating drum to which the first and second magnetic heads are attached;

second signal switching means for receiving signals reproduced from the same first track traced again by a third magnetic head and from the same second track traced again by a fourth magnetic head, each of the third and fourth magnetic heads having different azimuths, and for selecting the reproduced signals of one of the third and fourth magnetic heads based on a head switching signal received every half rotation of the rotating drum to which the third and fourth magnetic heads are attached;

third signal switching means for receiving the reproduced signals supplied from the first and second signal switching means and for selecting one of the reproduced signals supplied from the first and second signal switching means;

comparing means for comparing signal level of reproduced signals from the first and second signal switching means and for controlling the third signal switching means to select one of the received reproduced signals in accordance with the result of the comparison for each of the plurality of tracks traced, to thereby ensure reproduction of signals from tracks of a magnetic tape by a magnetic head having a same azimuth as a magnetic head which recorded the tracks onto the magnetic tape; and fourth signal switching means for receiving reproduced signals from the first, second and third signal switching means, for being switched to select the reproduced signal from only one of the first and second signal switching means when distortion of an output signal is recognized, the distortion resulting from the comparing means detecting virtually no difference in reproduced signal level of the received signals.

8. The magnetic reproduction device of claim 7, wherein the comparing means controls the third signal switching means to select the reproduced signal of the larger signal level, determined based on the comparison.

9. The magnetic reproduction device of claim 7, wherein the fourth signal switching means is manually switched.

* * * * *